Feb. 23, 1965  M. PHISTER, JR., ETAL  3,170,677
APPARATUS FOR MIXING MATERIALS
Original Filed Aug. 19, 1958  2 Sheets-Sheet 1
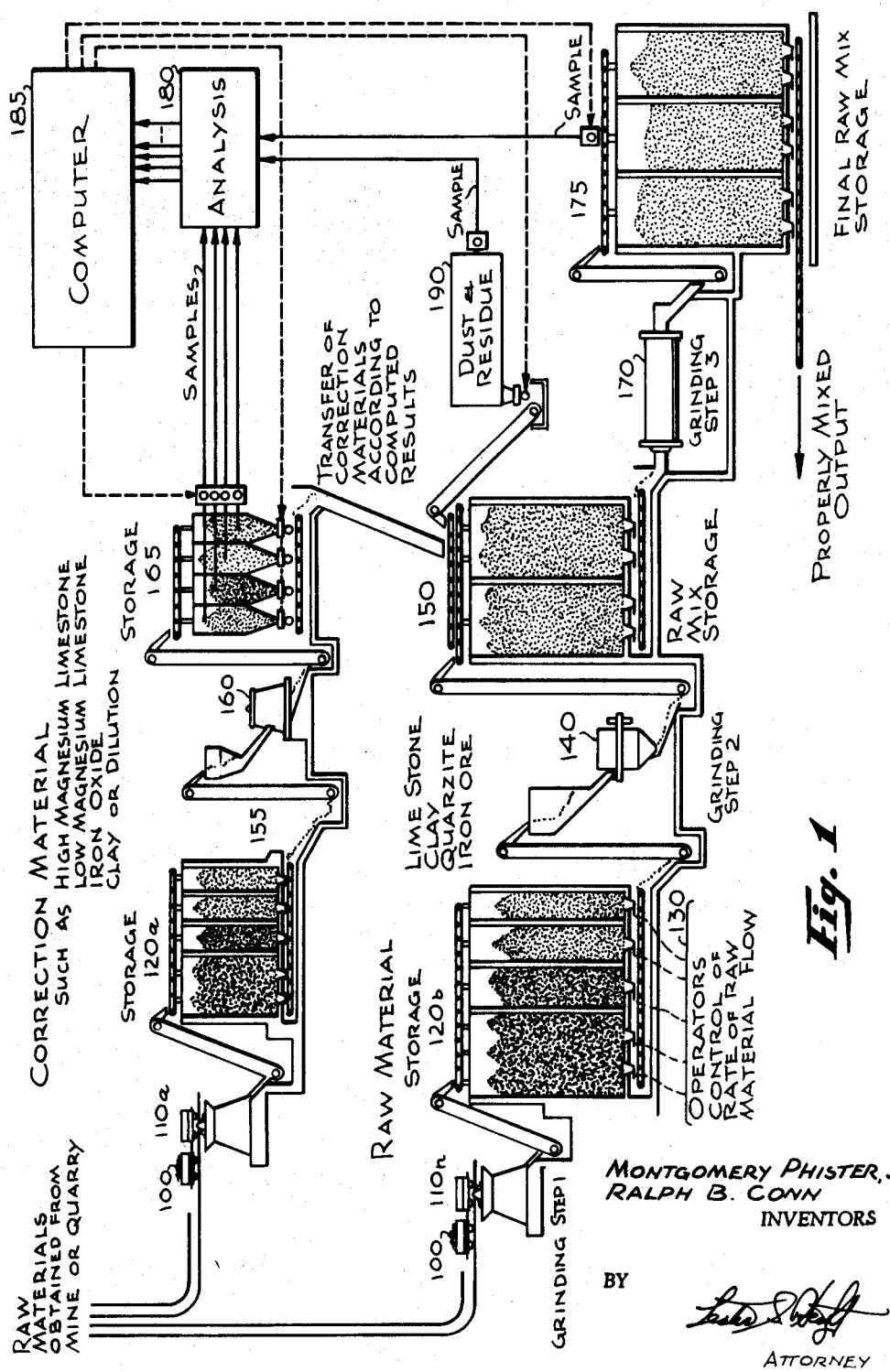
Fig. 1
MONTGOMERY PHISTER, JR.
RALPH B. CONN
INVENTORS
BY
ATTORNEY Feb. 23, 1965   M. PHISTER, JR., ETAL   3,170,677
APPARATUS FOR MIXING MATERIALS
Original Filed Aug. 19, 1958   2 Sheets-Sheet 2
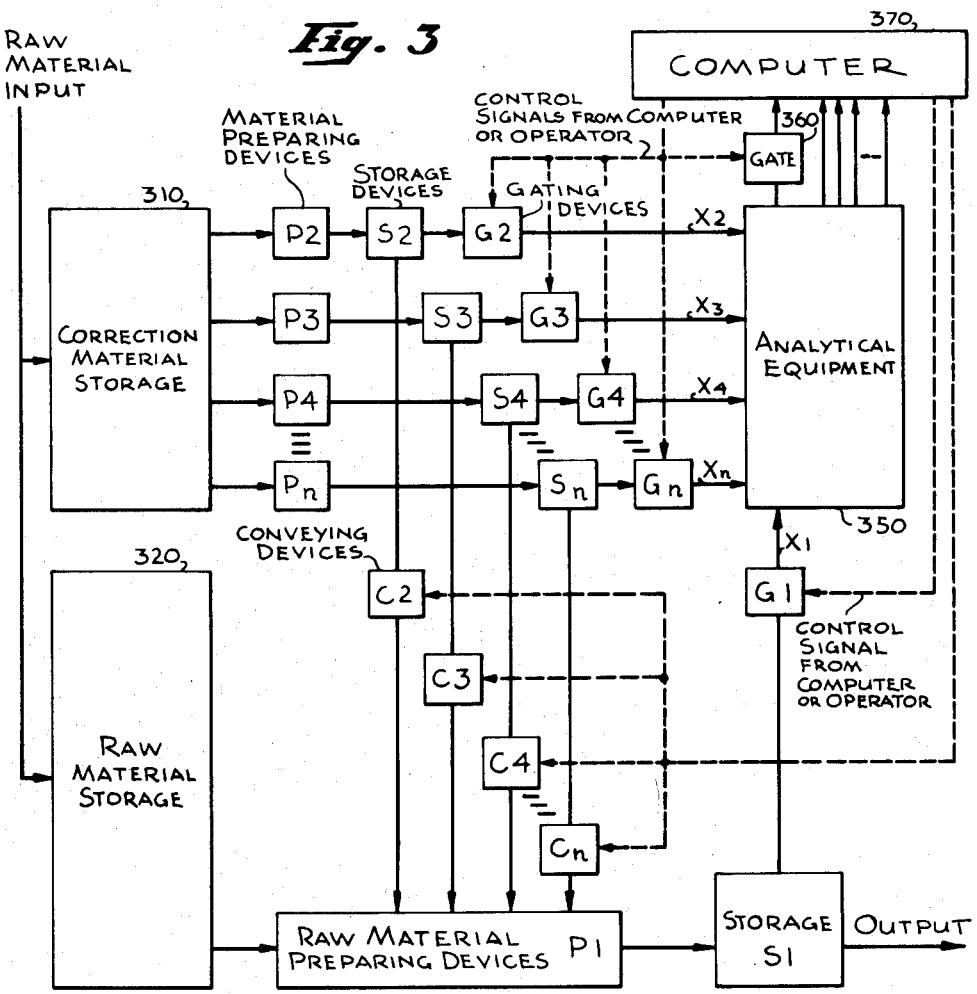
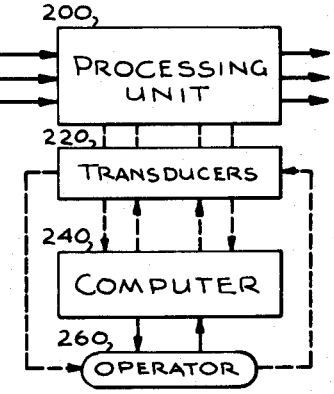
MONTGOMERY PHISTER, JR.
RALPH B. CONN
INVENTORS
BY
ATTORNEY

United States Patent Office 3,170,677
Patented Feb. 23, 1965

3,170,677
APPARATUS FOR MIXING MATERIALS
Montgomery Phister, Jr., Palos Verdes Estates, and Ralph B. Conn, San Pedro, Calif., assignors, by mesne assignments, to The Bunker-Ramo Corporation, Stamford, Conn., a corporation of Delaware
Original application Aug. 19, 1958, Ser. No. 755,989. Divided and this application Jan. 10, 1963, Ser. No. 261,922
4 Claims. (Cl. 259—154)

This application is a divisional of U.S. patent application Serial No. 755,989, filed August 19, 1958, by Ralph B. Conn et al. entitled "Method and Apparatus for Mixing Materials," which application is now abandoned.

This invention relates to apparatus for mixing materials and, more particularly, to apparatus for producing high quality compositions by means of a novel correction procedure.

The invention has been devised to solve the difficult problem of mixing raw materials having variable properties and/or quantities of certain elements or compounds which are required in a final mixture. In particular the present description will concern itself with the mixing problems involved in the preparation of cement or the blending of gasoline. In each of these cases the proper mixture of chemical compounds or elements is known for a given quality of composition; however, the mixing process is complicated by the fact that the percentages of compounds or elements which are desired in the final mixture may vary considerably in the raw materials which are used.

In the conventional cement mixing practice a so-called mix chemist is employed to adjust the feed rates of the raw materials which are to be mixed. These feed rates are set by the mix chemist on the basis of his experience and then are adjusted after making certain measurements as to the percentages of elements or compounds in the mix. In other words the quality of the mixture is almost entirely a function of the reliability of the mix chemist's experience and his ability to make adjustments after measurement.

In practice the conventional approach has made it difficult to product high-quality mixtures without a considerable loss of time in making the necessary adjustments. Furthermore, even the presence of an ideal mix chemist who is theoretically infallible cannot solve the problem of sudden changes in raw material composition. The net result in the cement industry as an illustrative case is that high quality cement cannot be produced efficiently at a high rate and excessive storage space is required to permit the adjustment of poor mixes.

The invention contemplates a novel correction apparatus for mixing which is adapted to produce high-quality mixtures at high speed. According to the invention a raw mix is prepared and then analyzed to determine the percentages of the compounds or elements therein which are required for the final mix. At the same time a set of correction materials, which may be the same as the basic materials used to form the raw mix, are analyzed to determine the percentages of the desired compounds or elements therein. The results of the correction material and raw mix analysis are then utilized to determine the amounts and types of correction material which must be added to the raw mix to compensate for excesses or deficiencies of compounds or elements desired therein, and thereby produce a perfect mixture.

While in theory the correction materials may be the same as the basic raw materials used in the raw mix, in practice it may be preferred to provide special correction materials which are essentially complementary to the expected content of the raw mix. That is, where the raw material is believed to have a relatively high content of a compound, such as magnesium oxide used in the cement making process, the corresponding correction material is selected to have a relatively low content of magnesium oxide. In a typical cement mixing process according to the present invention, for example, the correction materials may be: (1) high-magnesium limestone; (2) low-magnesium limestone; (3) iron oxide; and (4) clay or dilution.

In the case of cement mixing, for example, the invention may be practiced with apparatus where samples of the raw mix and correction materials are fed to an X-ray emission spectroscope. The spectroscope then emits X-rays of characteristic wavelengths which provide an accurate measure of the amount of element or compound present. These wavelengths may then be measured with a geiger or proportional counter.

The X-ray count, representative of element or compound percentages, may be fed automatically to a computer which is arranged to solve certain fundamental equations defining the amounts of correction material to be transferred to the raw mix. It is also contemplated by the invention, however, that analytical equipment, such as the X-ray machine just described, may be operated to provide an answer which is fed into the computer by an operator.

It will be shown in the detailed description which follows that mixing in accordance with the invention not only permits the highly accurate mixing of raw materials having varying contents of desired compounds or elements, but also makes possible a high-speed correction technique whereby a continuous stream of raw materials may be mixed. The result, furthermore, is a composition having constituents proportioned to a degree of accuracy never before possible. Consequently high quality compositions are produced rapidly and at low cost.

Accordingly it is an object of the present invention to provide an improved apparatus for mixing raw materials having variable contents of particular compounds and/or elements to obtain a composition wherein these compounds and/or elements are contained in any desired percentages.

Another object of the invention is to provide a rigorous control for mixing materials to produce an optimum quality mixture.

A further object is to provide apparatus for mixing chemicals or other raw materials to provide a high quality product economically and with minimum necessity for human intervention.

Yet a further object is to provide a raw material mixing apparatus which does not require the time and cost of a skilled mix chemist's supervision.

Still another object is to provide apparatus for automatically mixing chemicals to produce an accurate mixture of certain elements and/or compounds.

Yet another object is to provide apparatus for mixing materials with means for automatically salvaging by-products and/or waste products.

A specific object is to provide a novel apparatus for correcting for deficiencies or excesses in elements or compounds in a preliminary composition to produce a final composition.

Another specific object is to minimize the amount of time and storage space required for mixing raw materials.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

FIGURE 1 is a flow diagram illustrating a typical process performed according to the invention;

FIGURE 2 is a block diagram illustrating the general form of apparatus in accordance with the invention; and FIGURE 3 illustrates in further detail suitable apparatus for performing mixing corrections according to the present invention.

Reference is now made to FIGURE 1 where the correction technique of the invention is illustrated with particular reference to the manufacture of cement. As indicated, raw material 100 which may have been obtained from a mine or quarry is conveyed by suitable means to grinding mechanisms $110a \ldots 110n$ ($n$ is used to indicate that the number of grinding mechanisms is variable). The ground material is then stored in appropriate bins: bin $120a$ for correction materials; and bin $120b$ for raw mix. Each bin may have a plurality of partitions for separating the materials therein as desired. An operator's control 130 is indicated associated with bin $120b$ for forming the raw mix which is then ground in a second step by mechanism 140 and then conveyed to a suitable storage device such as silo 150.

In addition a flow of material is indicated along line 155 to grinding mechanism 160 and thence to storage bins 165. As illustration of appropriate correction materials for the cement manufacturing process these correction materials are indicated to be: (1) high magnesium limestone; (2) low magnesium limestone; (3) iron oxide; and (4) clay.

Simultaneously with the correction material flow just described the raw mix may be further refined by a third grinding step in mechanism 170 and then is stored in bin 175. At this point the flow of all material, both raw mix and correction material passes through an analysis step 180. During this phase of operation each correction material is analyzed as is also the raw mix, in order to determine the percentage of the oxides of calcium, iron, magnesium, silicon, and aluminum, therein. It will be understood, of course, that in other processes the analysis may be performed for elements or compounds other than oxides.

The results of step 180 are then passed on to a computer 185 which is arranged to solve certain simultaneous equations introduced below which define the correction control feature of the invention. This solution then indicates the amount of each correction material which must be added to the raw mix. Following the computing step a transfer of materials to raw mix storage bin 175 is made according to the computing results.

In addition it will be noted that a flow of dust and residue 190 is indicated to the analysis step 180 and the computing step 185 indicates an amount for transfer to raw mix storage 175. This is intended to indicate that dust and residue may, as well as the correction materials, be utilized to modify the raw mix until it is properly proportioned in the desired compounds or elements.

While the invention is principally described by considering the particular details of the cement process, it will be understood that the particular application is not intended as a limitation of the invention since it may beneficially be applied to many other processes such as the blending of gasoline, the manufacture of steel and of other alloys, the manufacture of glass, and the making of certain types of foods, and is especially advisable in processes which must meet fairly rigid specifications in the percentages of compounds or components therein.

The extent of the control problem solved by the invention is clearly illustrated by considering the range of variations of oxides in the raw materials used in the manufacture of cement. This is set forth in Table I below.

TABLE I

*Ranges of raw material characteristics*

[Cement making process]

| Material | $SiO_2$, percent | $Al_2O_3$, percent | $Fe_2O_3$, percent | CaO, percent | MgO, percent |
|---|---|---|---|---|---|
| Limestone | 0–25 | 0–5 | 0–2.4 | 30–54.4 | 0–10 |
| Clay | 30–70 | 2–18 | 1–5 | 3–35 | 0.5–3.0 |
| Iron Ore | 1–6 | 0–4 | 75–95 | 0–6 | 0–8.5 |
| Quartzite | 87–95 | 1–3 | 1–3 | 0–3 | 0–1 |

It will be noted in particular in Table I that the percentage of MgO in limestone varies from 0 to 10%. Since this percentage is very important in determining the quality of the finished cement, and since it also influences the useful yield from the quarry, it is evident that something must be done to compensate for an excess or a deficiency of this compound.

A similar problem arises in the blending of gasoline where the output from a thermal cracking plant, a catalytic cracking unit, a polymerization plant, and straight run gasoline of low octane quality may be blended to obtain the desired gasoline output. Each of the input quantities has a variable amount of certain chemicals, elements, or other properties, which are desired in the output mixture. Some means must be provided then for compensating for excesses or deficiencies in the desired chemical compounds or elements.

It will be understood, of course, that while the process of the invention is concerned with the mixing of materials, the control may be employed to achieve particular physical parameters in a mixture, rather than a particular composition. Thus in blending gasoline the method of the invention may be employed to attain a specified octane number, vapor pressure, or boiling point, which properties are only indirectly related to composition.

In the production of cement five compounds are of the utmost importance in cement quality. These are: tricalcium silicate, dicalcium silicate, tricalcium aluminate, tetracalcium aluminoferrite, and magnesium oxide. The first four compounds will here be indicated in abbreviated form as C3S, C2S, C3A and C4AF, respectively, and the last as MgO.

In the manufacture of cement, it is known that if a complete analysis of a clinker shows C% of CaO      S% of $SiO_2$
A% of $Al_2O_3$      F% of $Fe_2O_3$ then it is possible to calculate the amounts of four of the above-mentioned cement compounds from the following formulas:

$$(C4AF) = 3.0432F \quad (1)$$

$$(C3A) = 2.6504A - 1.692F \quad (2)$$

$$(C2S) = 8.6024S + 1.0785F + 5.0683A - 3.071C \quad (3)$$

$$(C3S) = 4.071C - 1.4297F - 7.6024S - 6.7187A \quad (4)$$

(Here the symbol (C4AF), for example, represents the percent of C4AF in the clinker.) Furthermore, if M is the percentage of MgO in the clinker, then $$(MgO) = M \quad (5)$$

This is because the magnesium oxide does not react with the other oxides.

For the purpose of analysis it will be designated that the five raw materials used in cement manufacture contain calcium oxide in the following percentages: the first $c_1$%; the second $c_2$%; the third $c_3$%; the fourth $c_4$%; and the fifth $c_5$%.

Then if we take $x_1$ pounds of the first raw material, $x_2$ pounds of the second raw material, $x_3$ pounds of the third raw material, $x_4$ pounds of the fourth raw material, and $x_5$ pounds of the fifth raw material, then the mixture, containing a total of $x_1+x_2+x_3+x_4+x_5$ pounds, will contain $$\frac{c_1x_1+c_2x_2+c_3x_3+c_4x_4+c_5x_5}{100} \text{ pounds of CaO}$$

That is to say, $$\frac{1}{100}(c_1x_1+c_2x_2+c_3x_3+c_4x_4+c_5x_5)=\text{C pounds of CaO}$$

(6)

In a similar way we can write equations for the other oxides.

$$\frac{1}{100}(f_1x_1+f_2x_2+f_3x_3+f_4x_4+f_5x_5=)\text{F pounds of Fe}_2\text{O}_3$$

(7)

$$\frac{1}{100}(a_1x_1+a_2x_2+a_3x_3+a_4x_4+a_5x_5)+\text{A pounds of Al}_2\text{O}_3$$

(8)

$$\frac{1}{100}(m_1x_1+m_2x_2+m_3x_3+m_4x_4+m_5x_5)=\text{M pounds of MgO}$$

(9)

where $f_1, f_2, \ldots, a_1, a_2, \ldots, s_1, s_2, \ldots,$ and $m_1, m_2, \ldots$ are the percentages of $Fe_2O_3$, $Al_2O_3$, $SiO_2$, and MgO, respectively, in the first, second, third, fourth and fifth raw material, respectively. Now returning to Equations 1 and 5, we note that by assigning values to (C4AF), (C3A), (C2S), (C3S), and (MgO)—that is, by deciding that we want to manufacture a clinker having certain specified characteristics—we automatically determine C, A, F, S, and M (the oxide percentages). This means that for control purposes we may use Equations 6 to 9 rather than Equations 1 to 5. It will be noted that C, A, F, S, and M are percentages calculated on the clinker or loss-free basis, while $c$, $a$, $f$, $s$, and $m$ are raw material percentages.

The specific equations above can be generalized for any mixing process as follows:

$$\frac{1}{100}(a_1.x_1+\ldots a_n x_n)=A$$

$$\frac{1}{100}(n_1.x_1+\ldots n_n.x_n)=N$$

where $a_1 \ldots a_n$ represent the percentages of A in each of materials $x_1 \ldots x_n$, and $n_1 \ldots n_n$ represent the percentages of N in each of materials N. The symbols $n$ and N are utilized to indicate that both the numbers of materials and desired constituents are variable.

There are many methods for determining the percentages of the various oxides in the raw mix and in the correction material. For example, the standard wet chemical analytical method may be employed which would require about six hours to determine the percentages of the five oxides in each of the five materials which are analyzed. This manner of testing would be appropriate where high speed correction is not required because rigorous control of the first output is not necessary but is not appropriate where precision of final output is desired.

Where more accurate and higher speed methods are desired an optical method may be employed where a sample of the material is burned in an electric arc or spark. Each element present then emits a light of characteristic wavelength. These wavelengths are separated in an optical system using slits with a prism or a ruled grating. The intensity of radiation at the characteristic wavelength is an accurate measure of the amount of the element present and may be measured either by exposing a photographic film or by using a photo multiplier tube. The film is inherently less accurate than the multiplier tube.

In the alternate method of X-ray spectroscopic analysis may be utilized. In this case a sample of each material is irradiated with X-ray. Each element then emits X-rays of a characteristic wavelength. The various wavelengths are separated by a reflecting crystal of special characteristics, employing the Bragg effect. The intensity of radiation at the characteristic wavelength is an accurate measure of the amount of element present and may be measured with a geiger counter.

For the purpose of the present description the X-ray emission technique will be utilized for automatic control. The count provided by the X-rays may be used to automatically control a computer which may then produce a highly accurate answer in a short period of time following the introduction of the data thereto.

In terms of accuracy the optical equipment discussed above provides accuracy in the order of 3% of the amount present whereas the X-ray equipment may provide an accuracy as good as .3%.

From the description thus far it should now be apparent that the technique of the invention has several advantages over known techniques. Firstly, the correction material which is employed need not be stored in any great quantity so that the total material storage may be thereby reduced. The reason for this is that the correction technique of the invention makes it unnecessary to pass the entire mix through the process for re-analysis. That is, the correction process makes possible small changes which may also be performed at relatively high speed.

The net result is that the invention makes possible not only a less expensive process, but permits the production of a higher quality product, since the testing and computing contemplated by the invention may be performed very accurately and at very high speed.

Another feature of the invention is that it lends itself readily to automation. The general form apparatus for automatic control is illustrated in FIGURE 2. It will be noted therein that a processing unit 200 receives raw materials, chemicals, water, etc., as well as electricity heat, etc., and produces products, by-products, and waste. Associated with the processing unit 200 are a plurality of transducers 220 which may correspond to the X-ray testing devices proposed for use in the cement process discussed above. Transducers 220 send signals to a computer 240 indicating certain analytical information which is required in the control of the process. Computer 240 may be controlled in part by an operator indicated as 260 who may also have some direct control over the transducers. That is operator 260 may upon occasion enter the information provided by the transducers into computer 24.

The form of typical apparatus for carrying out the mixing technique of FIGURE 2 is indicated in further detail in FIGURE 3. Here it will be noted that raw material input is separated into two storage devices, one for correction referenced as 310 and one for raw material reference as 320. The correction material storage device has means for conveying material therein (indicated as an illustration to include four materials) to a corresponding number of material preparing devices referenced as P2, P3, P4, . . . P$n$.

Raw material storage device 320 is associated with means for conveying the material to raw mix preparing device P1, which is similar to any of devices P2 through P$n$. These devices may include various grinding stages as indicated in the cement preparation method discussed with reference to FIGURE 1. The material which is prepared in devices P1 through P$n$ is passed then for temporary storage to storage devices S1 . . . S$n$. Each of the storage devices then is associated with material gating means, referenced as G1 through G$n$, associated with storage devices S1 through S$n$, respectively. As indicated in FIGURE 3, these gating means are controlled by signals received from the computer or an operator. In some applications the computer itself may be coupled to the gating means 360 to control the transfer of the samples automatically.

It will be noted that the coupling connections between the gating means and analytical equipment 350 are referenced as $x1$ through $xn$, respectively, corresponding to the mathematical equations introduced above. Analytical equipment 350 then is operative to produce signals indicating the relative percentages of the compounds which are desired in the final mix. These signals are transferred under the control of a signal or the operator to a computer 370.

Computer 370 then produces output signals which represent the amount of correction material of each type which must be transferred to the raw mix preparing devices, in order to compensate for deficiencies or excesses of certain compounds or elements. Computer 370 is coupled to conveying devices referenced as C2, C3, C4, . . . Cn which are adapted to effect transfer of correction materials from storage devices S2, S3, S4, . . . Sn respectively to raw mix preparing device, P1.

In operation the system of FIGURE 3 may be continuous, since the computing function requires an amount of time of negligible magnitude compared to the physical transfer time of the raw material; that is, if the raw materials are prepared and corrected each hour and then sent out for use, the computer may operate to solve the various analytical problems involved during the hour and provide an answer without delaying the transfer of the final mix.

From the foregoing description it should now be apparent that the present invention provides a novel and appropriate apparatus for mixing raw materials, where certain compounds or elements therein must be combined in predetermined percentages. It has now been established that the basic technique itself is advantageous in permitting the accurate mixing of raw materials and further in that it lends itself very readily to automation, whereby materials may be mixed in steady flow and accurately proportioned as desired.

While the description has been primarily concerned with the mixing of cement it has been pointed out that it is easily applicable to the blending of gasoline, where the raw materials may vary in the percentages of certain compounds which are desired. It has also been indicated that other processes such as the making of alloys, glass, and food products may involve the same problem. It will be understood, therefore, that the appended claims are generic to any process which involves the mixing of raw materials having varying percentages of compounds or elements.

What is claimed as new is:

1. Apparatus for producing a mixture having predetermined percentages of certain compounds or elements comprising: first means for preparing and storing a raw mix approximating the desired percentages of said compounds or elements; second means, including a plurality of material preparing devices, for preparing and storing a corresponding plurality of correction materials, each correction material being selected to permit the correction of a deficiency or excess of a different one of said compounds or elements; third means operable to receive test samples and provide signals indicating the percentage contents of said compounds or elements therein; fourth means for selectively conveying said raw mix and each of said correction materials to said third means; fifth means including means defining predetermined simultaneous equations, responsive to said signals provided by said third means for solving said equations to determine the proper amounts of said correction materials needed for modifying said raw mix to compensate for any compound or element deficiency or excess therein; and sixth means for conveying said needed correction materials to said first means.

2. The apparatus defined in claim 1 wherein said mixture is cement, said elements are calcium, iron, aluminum, silicon and magnesium, and wherein said compounds are the oxides of said elements.

3. Apparatus for correcting for deficiencies or excesses of elements or compounds in a preliminary composition of amount $x_1$ comprising: means for preparing amounts of correction materials $x_2, \ldots x_n$, each correction material being selected to correct for a different error in mixture of said preliminary composition; means for measuring the percentages of each of said elements of compounds in said preliminary composition and in each of said correction materials; means defining simultaneous equations expressing the relationship between said correction materials and said preliminary composition to develop a desired final composition; and computing means for solving said equations to determine the correction amounts $x_2 \ldots x_n$ required for correcting the mixture error in said preliminary composition.

4. The apparatus defined in claim 3 wherein said computing means is arranged to solve the general equations:

$$a_1.x_1 + a_2.x_2 \ldots + a_n.x_n = A$$

$$\vdots$$

$$n_1.x_1 + n_2.x_2 \ldots + n_n.x_n = N$$

where $a_1 \ldots a_n \ldots n_1 \ldots n_n$ represent the percentages of said elements or compounds in respective amounts $x_1 \ldots x_n$, and $A \ldots N$ represent the desired amounts of said elements or compounds in the final composition.

References Cited by the Examiner

FOREIGN PATENTS 569,822    8/58    Belgium.

CHARLES A. WILLMUTH, *Primary Examiner.*